(12) United States Patent
Fraser et al.

(10) Patent No.: US 6,260,697 B1
(45) Date of Patent: Jul. 17, 2001

(54) FISHING ROD ACCESSORIES AND FOOD AND BEVERAGE HOLDER

(76) Inventors: Rick Fraser, 22162 Laguna Cir.; Bob Bauermeister, 9561 Panacea Dr., both of Huntington Beach, CA (US) 92646

( * ) Notice: Subject to any disclaimer, the term of this patent is extended or adjusted under 35 U.S.C. 154(b) by 0 days.

(21) Appl. No.: 09/519,374

(22) Filed: Mar. 6, 2000

(51) Int. Cl.[7] .................................................. A01K 97/10
(52) U.S. Cl. ........................... 206/217; 43/21.2; 43/54.1; 206/315.11; 220/737
(58) Field of Search ................................... 43/21.2, 54.1; 206/217, 315.1, 315.11, 579; 220/737

(56) References Cited

U.S. PATENT DOCUMENTS

| D. 239,015 | 3/1976 | Stout | D22/5 |
|---|---|---|---|
| D. 352,089 | 11/1994 | Barber et al. | D22/147 |
| D. 381,392 | 7/1997 | Darling | D22/148 |
| D. 394,300 | 5/1998 | Samuels et al. | D22/148 |
| D. 404,975 | 2/1999 | Fegan | D7/620 |
| 2,153,549 | * 4/1939 | Cooper | 43/54.1 |
| 3,201,017 | * 8/1965 | Morrissey | 206/315.11 |
| 3,389,489 | * 6/1968 | Burns | 43/21.2 |
| 3,913,746 | 10/1975 | Burton | 211/64 |
| 4,323,181 | * 4/1982 | Spasoff | 43/21.2 |
| 4,671,009 | 6/1987 | Faunce | 43/54.1 |
| 4,749,162 | 6/1988 | Wanzor | 248/558 |
| 4,841,660 | * 6/1989 | James | 43/21.2 |
| 4,953,318 | * 9/1990 | Vasseur, Jr. | 43/21.2 |
| 5,007,612 | 4/1991 | Manfre | 248/558 |
| 5,054,738 | 10/1991 | Harding | 248/538 |
| 5,125,615 | 6/1992 | Mcquire | 248/512 |
| 5,182,877 | * 2/1993 | Burchill et al. | 43/54.1 |
| 5,344,115 | 9/1994 | Mayne et al. | 248/514 |
| 5,414,953 | * 5/1995 | Taylor | 43/21.2 |
| 5,813,163 | 9/1998 | Dysarz | 43/21.2 |
| 5,913,673 | * 6/1999 | Womac | 43/21.2 |
| 5,941,015 | * 8/1999 | Jenkins | 43/54.1 |
| 5,992,717 | * 11/1999 | Clewes et al. | 43/21.2 |

* cited by examiner

Primary Examiner—Jim Foster
(74) Attorney, Agent, or Firm—Dennis W. Beech

(57) ABSTRACT

The holder is a three sided tray with a beverage holder attached at a fourth side. Two opposing sides have slots through which a strap is inserted. The strap has a fastener such as a buckle, hook and loop material or other such elements. In use the strap is wrapped around and fastened on a support structure on a boat, pier or at other fishing locations. The most common such structure would be a railing. The holder also has a clamp for holding a fishing rod attached to one of the sides. The user may thereby store the fishing rod and accessories at a preferred location as well as any beverage of food items desired.

7 Claims, 1 Drawing Sheet

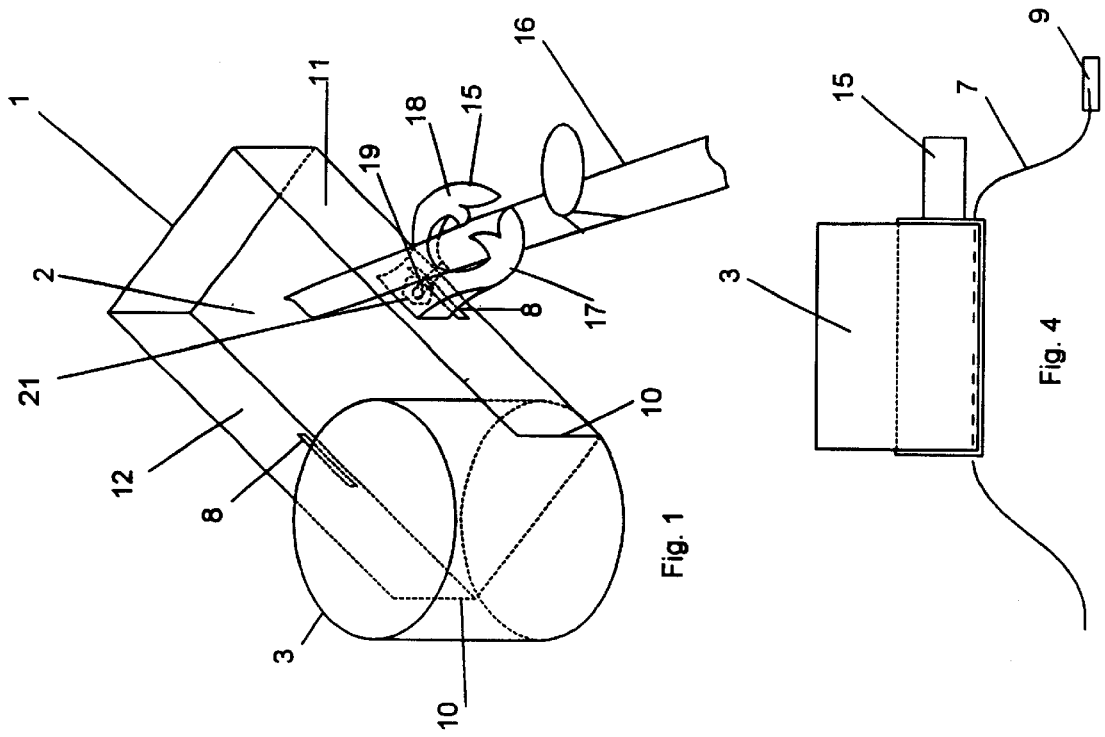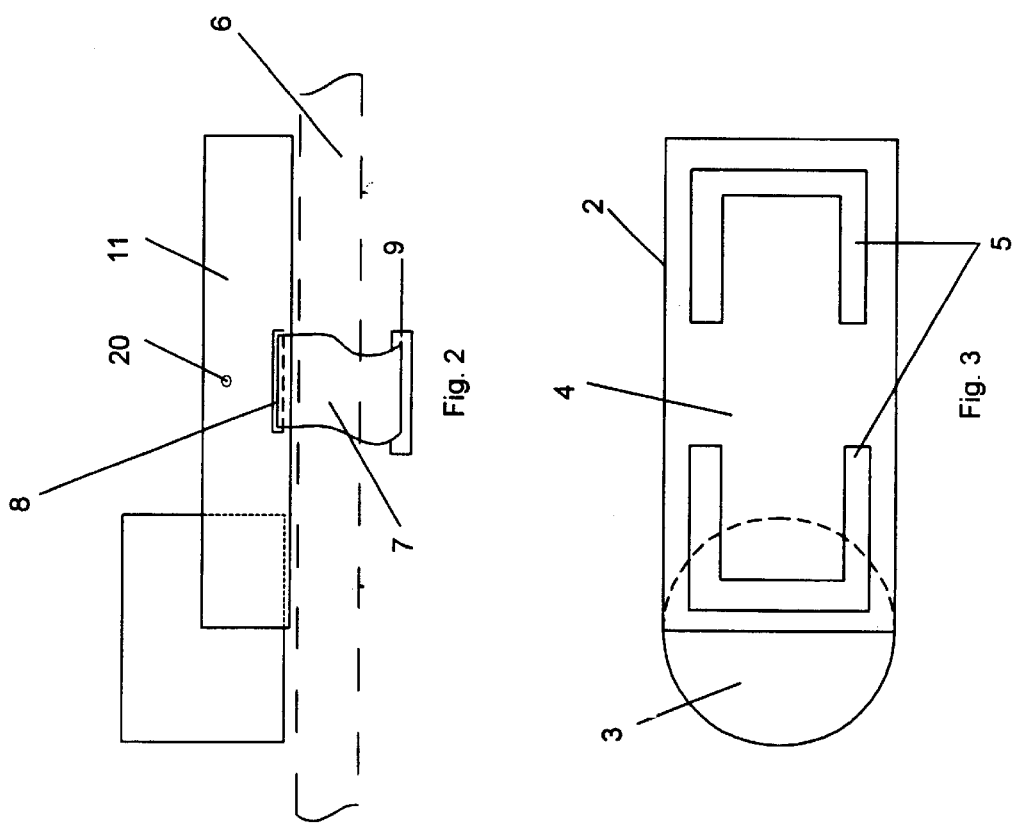

FISHING ROD ACCESSORIES AND FOOD AND BEVERAGE HOLDER

BACKGROUND OF THE INVENTION

1. Field of the Invention

This invention relates to devices used as organizers and holders to retain and store fishing rods and accessories as well as food and drink containers while engaged in fishing activities. The new device provides a simple compact organizer which may be attached to the railing or other structure of a boat, pier and the like from which the user is fishing.

2. Description of Related Art

There are currently in use various devices for organizing fishing equipment and other items used by persons while fishing. One example of such devices is U.S. Pat. No. Des. 381,392, issued Jul. 22, 1997. This disclosure includes a tray to which several tubular members are attached. Two such members are attached at angles apparently to allow insertion of fishing rods to hold the fishing rods while the fishing line and other elements are being used to fish. One tubular member appears to allow for attachment to a vertical pole and the fourth tubular member use is unclear. In general the available devices appear to be for use when the fishing line, bait, etc. are deployed in the act of fishing.

The present invention provides a simple tray structure for retention of objects and a tubular element for holding drink containers. The device may be attached by a strap to any properly oriented structural element of a boat, pier and the like. A convenient structural element to use is a railing. In addition there is a holding means as for example an elastic forked clamp, clasp or the like into which a fishing rod may be inserted.

SUMMARY OF THE INVENTION

One object of the present invention is an improved fishing activity organizer with a flexible retention means for a structural element in the vicinity of the user. Another object is simple storage of a fishing rod at the fishing location.

In accordance with the description presented herein, other objectives of this invention will become apparent when the description and drawings are reviewed.

BRIEF DESCRIPTION OF THE DRAWING

FIG. 1 illustrates a top perspective view of the holder.

FIG. 2 illustrates a side elevation view of the holder.

FIG. 3 illustrates a bottom plan view thereof.

FIG. 4 illustrates an end view thereof.

DESCRIPTION OF THE PREFERRED EMBODIMENT

The fishing rod, accessories and food and beverage holder (1) is formed of tray with a cylindrical member attached at a side of the tray. Two slots in opposing sides of the tray are included through which an attachment strap is positioned. One or more elastic forked clamps are mounted on a side such that a fishing rod may be inserted and retained.

Referring to FIGS. 1 through 4, a tray (2) having a cylindrical beverage holder (3) attached at an end (10) forms the basic structure of the holder (1). The bottom (4) of the tray (2) may have rubber, neoprene or similar material gaskets (5) to inhibit movement of the holder (1) when mounted on a railing (6) or similar structure.

A strap (7) is passed through slots (8) in opposing sides (11, 12) of the holder (1) and is used to wrap around a structure such as a railing (6) on a boat, pier or the like fishing location. The strap (7) has a fastening means (9) such as a buckle, hook and loop, or the like to hold the strap (7) and tray (2) firmly on the railing (6). The holder (1) may thereby located and attached at the users fishing location.

An example of such use is on fishing boats where the railing may have notches for the users to rest their fishing rods when not in use. The holder (1) may be attached at the desired location as a place holder and organizer for the user. In addition, one or more clamping (15) or clasping devices may be attached to one of the sides (11, 12) oriented internally of the boat railing (6) for use as a retainer for the fishing rods (16) when not in use. The clamp (15) may be formed of a resilient material having a forked structure as illustrated in FIG. 1. Suitable material for the clamp (15) includes rubber, neoprene and the like which may be opened by the pressure of inserting a fishing rod (16) between the fork elements (17, 18) and which grip the fishing rod (16) when inserted. The clamp (15) may be attached to a side (11, 12) by for example a screw (19) inserted through an aperture (20) and threaded into the clamp base (21).

The tray (2) may be used to hold fishing accessories such as hooks, line and the like or for food and other items. The beverage holder (3) may also be used to store other items than a beverage container if so desired by the user.

While the invention has been particularly shown and described with respect to the illustrated and preferred embodiments thereof, it will be understood by those skilled in the art that the foregoing and other changes in form and details may be made therein without departing from the spirit and scope of the invention.

What is claimed is:

1. A device for organizing fishing equipment and ancillary items comprising:
    a tray having a bottom and a plurality of upstanding sides with a beverage holder attached at an end;
    two opposing sides having slots formed therein with a strap passing therethrough and the strap having a fastening means; and
    at least one of the sides having a clamp attached thereto by a means for attachment.

2. The device as in claim 1 wherein there is a gasket attached to the bottom outside of the tray.

3. The device as in claim 1 wherein the strap is of sufficient length for wrapping around a railing and fastening at the strap ends.

4. The device as in claim 1 wherein the fastening means is a buckle.

5. The device as in claim 1 wherein the fastening means is hook and loop material.

6. The device as in claim 1 wherein the clamp is comprised of a clamp base with two opposing fork elements extending therefrom which fork elements are elastic for insertion and removal of a portion of a fishing rod.

7. The device as in claim 1 wherein the means for attachment is one of the sides having an aperture formed therein through which a screw is inserted and threadably engaged with a clamp base.

* * * * *